US011561568B2

(12) United States Patent
Nakase et al.

(10) Patent No.: US 11,561,568 B2
(45) **Date of Patent: *Jan. 24, 2023**

(54) MULTI-DIRECTIONAL INPUT DEVICE AND GAME MACHINE

(71) Applicant: Shenzhen Zesum Technology Co., Ltd., Shenzhen (CN)

(72) Inventors: Yusho Nakase, Shenzhen (CN); Shiying Yang, Shenzhen (CN); Chaoxian Chen, Shenzhen (CN)

(73) Assignee: Shenzhen Zesum Technology Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/232,626

(22) Filed: Apr. 16, 2021

(65) Prior Publication Data

US 2022/0155811 A1 May 19, 2022

(30) Foreign Application Priority Data

Nov. 19, 2020 (CN) ........................ 202011306057.6

(51) Int. Cl.
*G06F 3/033* (2013.01)
*G05G 9/047* (2006.01)

(52) U.S. Cl.
CPC ... *G05G 9/047* (2013.01); *G05G 2009/04718* (2013.01); *G05G 2009/04777* (2013.01)

(58) Field of Classification Search
CPC ......... G05G 9/047; G05G 2009/04718; G05G 2009/04777; H01H 25/065; A63F 13/24
(Continued)

(56) References Cited

U.S. PATENT DOCUMENTS 6,429,849 B1 8/2002 An et al.
9,097,890 B2 8/2015 Miller et al.
(Continued)

FOREIGN PATENT DOCUMENTS

JP H08297537 A 11/1996
JP 2003223276 A 8/2003
(Continued)

OTHER PUBLICATIONS

First Office Action issued in counterpart Japanese Patent Application No. 2020-197769, dated Nov. 17, 2021.
(Continued)

*Primary Examiner* — Thuy N Pardo
(74) *Attorney, Agent, or Firm* — Westbridge IP LLC

(57) ABSTRACT

Disclosed are a multi-directional input device and a game machine. The operating part includes a hemispherical upper hemisphere at a lower end. The upper hemisphere includes a hemispherical plane part at a lower part. Diameters of the hemispherical plane part and the upper hemisphere are the same. The diameter of the upper hemisphere is greater than that of the operating part. An upper support is fixed to the base and defines a hemispherical hole and hole wall of which is abutted against the upper hemisphere. The upper support further defines a through hole above the hemispherical hole, and the operating part is penetrated through the through hole. A diameter of the through hole is greater than that of the operating part. The upper support includes an upper support plane part below the hemispherical hole. A diameter of the upper support plane part is greater than that of the hemispherical hole.

16 Claims, 6 Drawing Sheets

(58) Field of Classification Search
USPC .......................................... 345/161, 156, 167
See application file for complete search history.

(56) References Cited

U.S. PATENT DOCUMENTS

| | | | | |
|---|---|---|---|---|
| 9,459,632 | B2 | 10/2016 | Houston et al. | |
| 10,770,247 | B1 * | 9/2020 | Wu | H01H 23/04 |
| 2003/0085793 | A1 * | 5/2003 | Inoue | H01H 3/0213 338/68 |
| 2012/0260763 | A1 * | 10/2012 | Terao | G05G 1/08 74/507 |
| 2016/0313759 | A1 * | 10/2016 | Okamura | H01H 25/04 |
| 2017/0213671 | A1 * | 7/2017 | Ohashi | H03K 17/9631 |
| 2017/0222645 | A1 * | 8/2017 | Miyazaki | H03H 9/175 |
| 2018/0190452 | A1 * | 7/2018 | Wu | H01H 25/04 |
| 2019/0358532 | A1 * | 11/2019 | Takei | G06F 3/016 |
| 2020/0097037 | A1 * | 3/2020 | Asano | G05G 9/047 |
| 2021/0113919 | A1 * | 4/2021 | Okamura | A63F 13/92 |
| 2022/0084762 | A1 * | 3/2022 | Nakase | H01H 25/04 |

FOREIGN PATENT DOCUMENTS

| | | | |
|---|---|---|---|
| JP | 2004111346 | A | 4/2004 |
| JP | 2008262720 | A | 10/2008 |
| TW | I636382 | B | 9/2018 |
| WO | 2007097194 | A1 | 8/2007 |

OTHER PUBLICATIONS

First Office Action issued in counterpart Taiwanese Patent Application No. 109141798, dated Dec. 6, 2021.

* cited by examiner

MULTI-DIRECTIONAL INPUT DEVICE AND GAME MACHINE

CROSS REFERENCE TO RELATED APPLICATIONS

The present disclosure claims the priority of Chinese Patent Application No. 202011306057.6, filed on Nov. 19, 2020 and entitled "MULTI-DIRECTIONAL INPUT DEVICE AND GAME MACHINE", which is hereby incorporated by reference in its entirety.

TECHNICAL FIELD

The present disclosure relates to the technical field of input devices, in particular to a multi-directional input device and a game machine using the same.

BACKGROUND

A multi-directional input device generally includes a housing, an operator pivotably arranged in the housing, two rocker arms that rotate with pivoting of the operator, and a detection device that detects rotating amount of the rocker arms and outputs a corresponding signal according to the rotating amount of the rocker arms. However, in the related art, the operator of the multi-directional input device is rotatably connected with one of the two rocker arms to limit the position, so that after the operator is driven, the reaction force generated by the spring sleeved on the operator only acts on the rocker arm. At this time, the rocker arm is prone to deformation and form resistance, which in turn results in that the rocker arm and another rocker arm need different operating forces when driven by the operator, so that the multi-directional input device has different hand feelings when operating in different directions.

SUMMARY

The main purpose of the present disclosure is to provide a multi-directional input device, which aims to enable the multi-directional input device to be arbitrarily operated in the direction of 360° without causing a difference in hand feeling.

In order to achieve the above purpose, the multi-directional input device provided by the present disclosure includes:

a cover defining an opening;

a pivotable operator protruding upward from the opening;

a first rocker arm and a second rocker arm rotating with pivoting of the operator, rotating axes of the first rocker arm and the second rocker arm being perpendicular to each other;

a first rotary electrical component and a second rotary electrical component respectively detecting rotation of the first rocker arm and the second rocker arm; and a base fixing the cover; where:

a pressing switch pressed by the operator to achieve electrical action; where:

the operator includes a cylindrical operating part protruding upward from the opening;

the operating part is provided with a hemispherical upper hemisphere at a lower end, the upper hemisphere includes a hemispherical plane part at a lower part, a diameter of the hemispherical plane part is the same as a diameter of the upper hemisphere, and the diameter of the upper hemisphere is greater than a diameter of the operating part;

the multi-directional input device further includes an upper support fixed to the base and defining a hemispherical hole, a hole wall of the hemispherical hole is abutted against the upper hemisphere, the upper support further defines a through hole above the hemispherical hole, the operating part is penetrated through the through hole, and a diameter of the through hole is greater than the diameter of the operating part; and the upper support includes an upper support plane part below the hemispherical hole, and a diameter of the upper support plane part is greater than a diameter of the hemispherical hole.

In an embodiment of the present disclosure, when the operator is in a vertical state, the hemispherical plane part and the upper support plane part are coplanar.

In an embodiment of the present disclosure, the multi-directional input device further includes a lower support installed on the base and including a hemispherical concave;

where the operator includes a lower hemisphere below the hemispherical plane part, a diameter of the lower hemisphere is smaller than the diameter of the upper hemisphere, and the lower hemisphere is disposed opposite to the hemisphere concave.

In an embodiment of the present disclosure, the multi-directional input device further includes a pressing bracket arranged on the base and below the lower support;

where a lower part of the lower support is pressed down the operator is pressed, and a fulcrum of the pressing bracket abutted against the base and an end of the pressing bracket are pressed down together with the operator to trigger the pressing switch to achieve electrical action.

In an embodiment of the present disclosure, the lower support and the pressing bracket are made of a resin material and integrally formed.

In an embodiment of the present disclosure, the multi-directional input device further includes a donut-shaped pressing plate and a coil spring, where the pressing plate is simultaneously abutted against the hemispherical plane part and the upper support plane part, a diameter of the pressing plate is slightly smaller than the diameter of the upper support plane part, and the pressing plate defines a hole having a diameter being slightly greater than the diameter of the lower hemisphere in a center; and the coil spring is clamped between the base and the pressing plate and presses the pressing plate in an upward direction.

In an embodiment of the present disclosure, the multi-directional input device further includes at least one plane part provided around the hemispherical plane part.

In an embodiment of the present disclosure, an intersection point of the rotating axes of the first rocker arm and the second rocker arm coincides with a spherical center of the upper hemisphere.

The present disclosure further provides a game machine, including a multi-directional input device, where the multi-directional input device includes:

a cover defining an opening;

a pivotable operator protruding upward from the opening;

a first rocker arm and a second rocker arm rotating with pivoting of the operator, rotating axes of the first rocker arm and the second rocker arm being perpendicular to each other;

a first rotary electrical component and a second rotary electrical component respectively detecting rotation of the first rocker arm and the second rocker arm; and a base fixing the cover; where:

a pressing switch pressed by the operator to achieve electrical action; where:

the operator includes a cylindrical operating part protruding upward from the opening; the operating part is provided with a hemispherical upper hemisphere at a lower end, the upper hemisphere includes a hemispherical plane part at a lower part, a diameter of the hemispherical plane part is the same as a diameter of the upper hemisphere, and the diameter of the upper hemisphere is greater than a diameter of the operating part;

the multi-directional input device further includes an upper support fixed to the base and defining a hemispherical hole, a hole wall of the hemispherical hole is abutted against the upper hemisphere, the upper support further defines a through hole above the hemispherical hole, the operating part is penetrated through the through hole, and a diameter of the through hole is greater than the diameter of the operating part; and the upper support includes an upper support plane part below the hemispherical hole, and a diameter of the upper support plane part is greater than a diameter of the hemispherical hole.

In an embodiment of the present disclosure, when the operator is in a vertical state, the hemispherical plane part and the upper support plane part are coplanar.

In an embodiment of the present disclosure, the multi-directional input device further includes a lower support installed on the base and including a hemispherical concave;

where the operator includes a lower hemisphere below the hemispherical plane part, a diameter of the lower hemisphere is smaller than the diameter of the upper hemisphere, and the lower hemisphere is disposed opposite to the hemisphere concave.

In an embodiment of the present disclosure, the multi-directional input device further includes a pressing bracket arranged on the base and below the lower support;

where a lower part of the lower support is pressed down when the operator is pressed, and a fulcrum of the pressing bracket abutted against the base and an end of the pressing bracket are pressed down together with the operator to trigger the pressing switch to achieve electrical action.

In an embodiment of the present disclosure, the lower support and the pressing bracket are made of a resin material and integrally formed.

In an embodiment of the present disclosure, the multi-directional input device further includes a donut-shaped pressing plate and a coil spring, where the pressing plate is simultaneously abutted against the hemispherical plane part and the upper support plane part, a diameter of the pressing plate is slightly smaller than the diameter of the upper support plane part, and the pressing plate defines a hole having a diameter being slightly greater than the diameter of the lower hemisphere in a center; and the coil spring is clamped between the base and the pressing plate and presses the pressing plate in an upward direction.

In an embodiment of the present disclosure, the multi-directional input device further includes at least one plane part provided around the hemispherical plane part.

In an embodiment of the present disclosure, an intersection point of the rotating axes of the first rocker arm and the second rocker arm coincides with a spherical center of the upper hemisphere.

According to the technical solution of the present disclosure, the operator of the multi-directional input device includes an operating part and an upper hemisphere. The operating part can be configured for user operation, and the upper hemisphere can be configured to limit and fix the operator. Specifically, the upper hemisphere is abutted against and fitted with the hole wall of the hemispherical hole of the upper support, and the upper hemisphere can be limited through the hole wall of the hemispherical hole. In the related art, the operator of the multi-directional input device is limited by one of the first rocker arm and the second rocker arm, so that when the operator is driven by the user, the generated reaction force may act on the first rocker arm or the second rocker arm that limits the operator, resulting in a difference in hand feeling of the operator when driving the first rocker arm and the second rocker arm. While according to the present disclosure, after the operator of the multi-directional input device is driven by the user, the reaction force generated will only act on the upper hemisphere of the operator and the upper support that limits the operator, without acting on the first rocker arm and the second rocker arm. That is, the first rocker arm and the second rocker arm are affected by the driving force of the operator, and are not affected by the reaction force, so that the first rocker arm and the second rocker arm are operated in different directions without causing a difference in hand feeling. In addition, the upper hemisphere of the operator in the present disclosure is hemispherical, so that the operator and the upper support are spherical rotation fit, therefore, the multi-directional input device can be arbitrarily operated in the direction of 360°.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are merely some embodiments of the present disclosure. For those of ordinary skill in the art, other drawings can be obtained based on the structure shown in these drawings without paying creative work.

Figure 1:
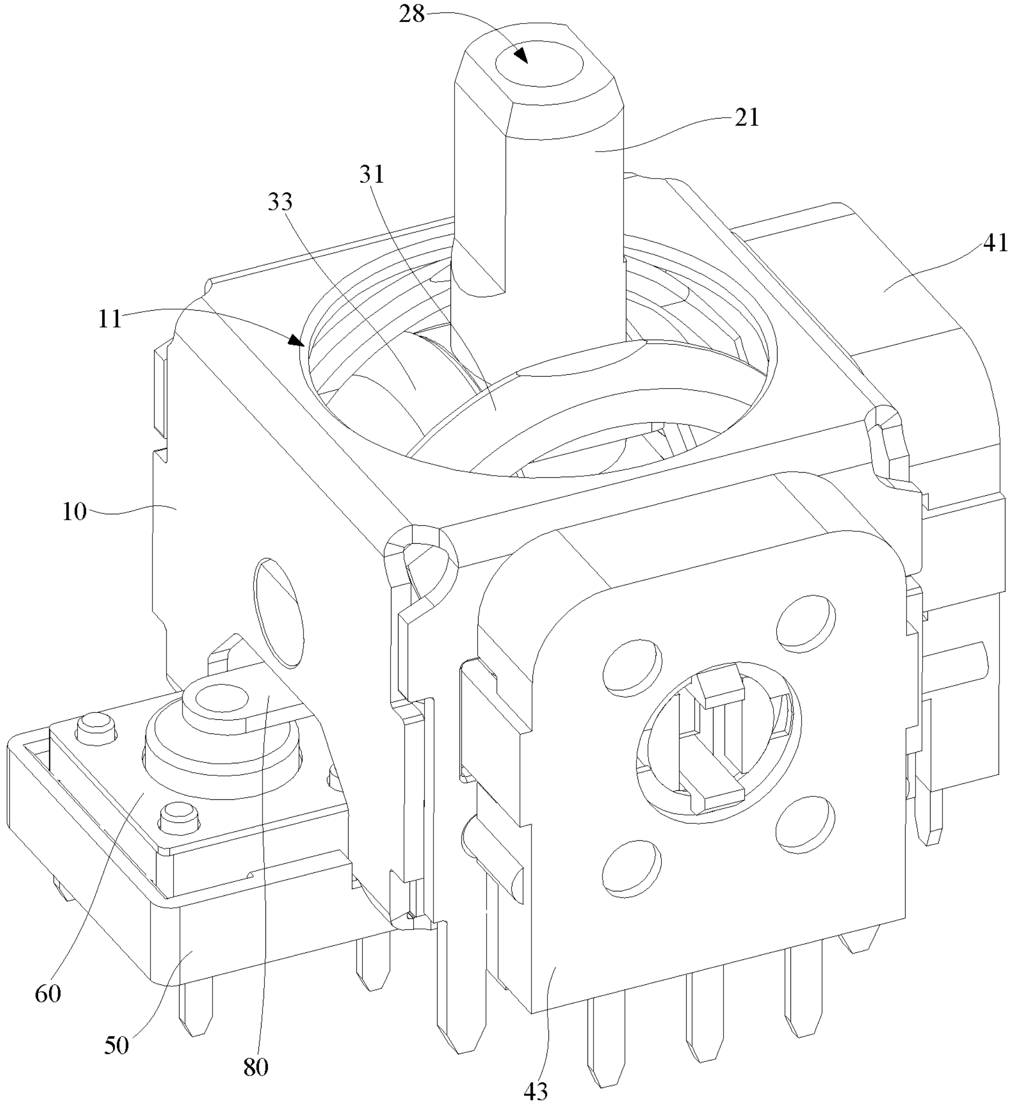
FIG. 1 is a schematic assembly view of a multi-directional input device according to an embodiment of the present disclosure.
Figure 2:
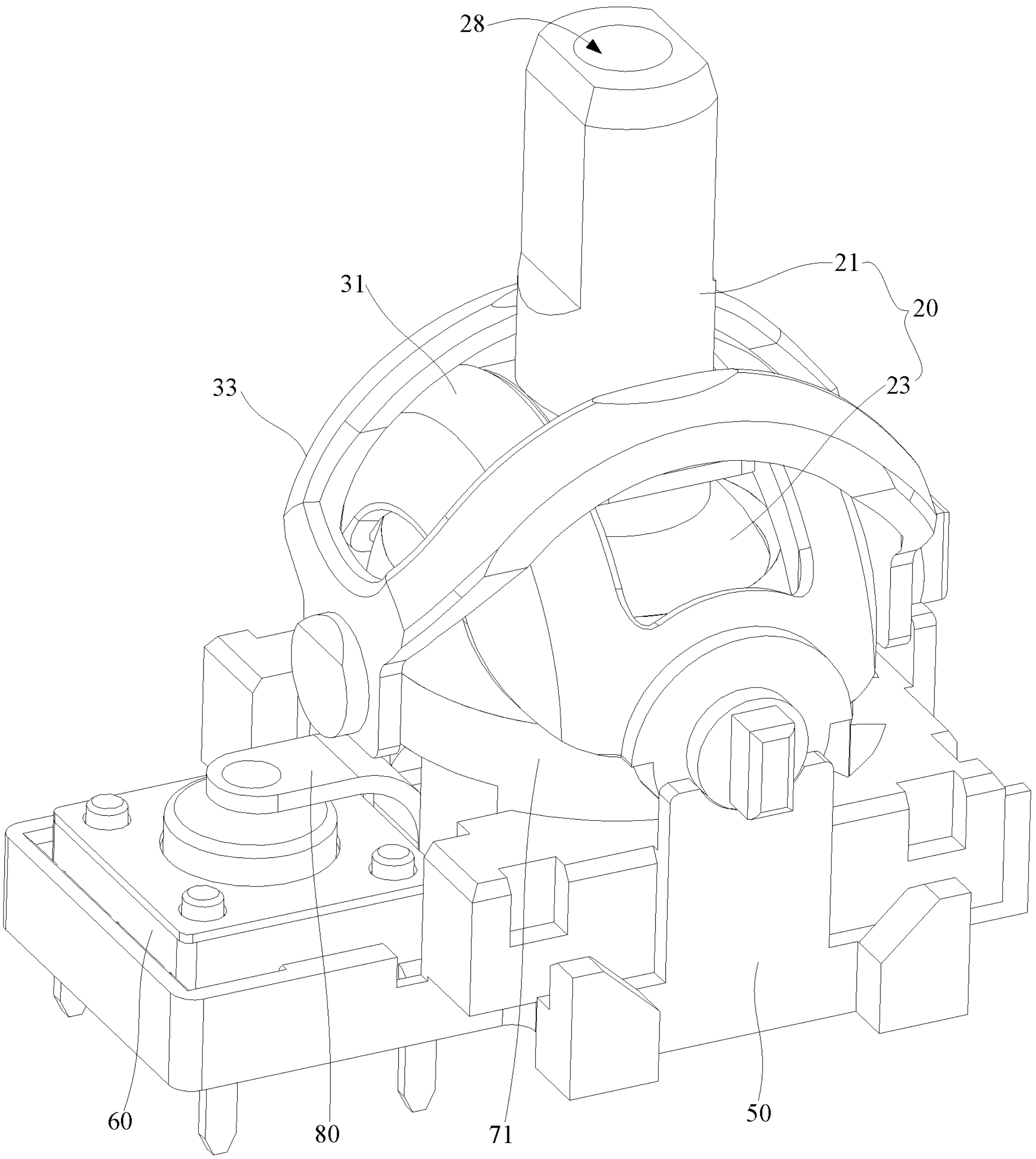
FIG. 2 is a partial view of the multi-directional input device in FIG. 1 with a cover removed.

The realization of the objects, functional characteristics and advantages of the present disclosure will be further described in conjunction with the embodiments and with reference to the drawings.

DETAILED DESCRIPTION OF THE EMBODIMENTS

In the following, the technical solutions in the embodiments of the present disclosure will be clearly and completely described with reference to the drawings in the embodiments of the present disclosure. Obviously, the described embodiments are only a part of the embodiments of the present disclosure, but not all of the embodiments. Based on the embodiments of the present disclosure, all other embodiments obtained by those of ordinary skill in the art without creative efforts shall fall within the claimed scope of the present disclosure.

It should be noted that all directional indicators (such as up, down, left, right, front, back, etc.) in the embodiments of the present disclosure are only used to explain the relative positional relationship, movement situation, etc. between components in a specific posture (as shown in the drawings). If the specific posture changes, the directional indication also changes accordingly.

In the present disclosure, unless otherwise clearly specified and limited, the terms "connected", "fixed", etc. should be understood in a broad sense. For example, "fixed" can be a fixed connection, a detachable connection, or a whole; it can be a mechanical connection or an electrical connection; it can be a direct connection or an indirect connection through an intermediary, and it can be the internal communication between two components or the interaction relationship between two components, unless specifically defined otherwise. For those of ordinary skill in the art, the specific meanings of the above terms in the present disclosure can be understood according to specific circumstances.

In addition, the descriptions related to "first", "second", and the like in the present disclosure are for descriptive purposes only, and cannot be understood as indicating or implying their relative importance or implicitly indicating the number of technical features indicated. Therefore, the features defined with "first" and "second" may explicitly or implicitly include at least one of the features. In addition, the technical solutions between the various embodiments can be combined with each other, but they must be based on what can be achieved by those of ordinary skill in the art. When the combination of technical solutions is contradictory or cannot be achieved, it should be considered that such a combination of technical solutions does not exist, nor within the protection scope of the present disclosure.

The present disclosure provides a multi-directional input device.

Referring to FIGS. 1, 2, 3 and 4, in an embodiment of the present disclosure, the multi-directional input device includes a cover 10, an operator 20, a first rocker arm 31, a second rocker arm 33, a first rotary electrical component 41, a second rotary electrical component 43, a base 50 and a pressing switch 60. The cover 10 defines an opening 11. The operator 20 is pivotable and protrudes upward from the opening 11. The first rocker arm 31 and the second rocker arm 33 rotate with pivoting of the operator 20, and rotating axes of the first rocker arm 31 and the second rocker arm 33 are perpendicular to each other. The first rotary electrical component 41 and the second rotary electrical component 43 respectively detect rotation of the first rocker arm 31 and rotation of the second rocker arm 33. The cover 10 is fixed by the base 50. The pressing switch 60 is arranged on the base 50 and pressed by the operator 20 to achieve electrical action. The operator 20 includes a cylindrical operating part 21 protruding upward from the opening 11. The operating part 21 is provided with a hemispherical upper hemisphere 23 at a lower end, and the upper hemisphere 23 includes a hemispherical plane part 25 at a lower part. A diameter of the hemispherical plane part 25 is the same as a diameter of the upper hemisphere 23, and the diameter of the upper hemisphere 23 is greater than a diameter of the operating part 21. The multi-directional input device further includes an upper support 71 fixed to the base 50 and located inside the cover 10. The upper support 71 defines a hemispherical hole 711 corresponding to the opening 11 of the cover 10. The upper support 71 further defines a through hole 713 communicated to the upper hemispherical hole 711 above the hemispherical hole 711, and a diameter of the through hole 713 is greater than the diameter of the operating part 21. A hole wall of the hemispherical hole 711 is abutted against the upper hemisphere 23, and a part of the upper hemisphere 23 is protruded from the through hole 713. The upper support 71 includes an upper support plane part 715 below the hemispherical hole 711, and a diameter of the upper support plane part 715 is greater than a diameter of the hemispherical hole 711.

In an embodiment of the present disclosure, the cover 10 can be mainly configured to shield the upper support 71, the first rocker arm 31, the second rocker arm 33 and part of the operator 20, so as to reduce the possibility of damage by foreign objects, which is beneficial to extend the service life of the multi-directional input device. A projection of the cover 10 on a horizontal plane may be roughly square shape. Specifically, the cover 10 may include a bottom wall and a side wall. The bottom wall and the base 50 are oppositely arranged, and the bottom wall defines an opening 11. The side wall is arranged around a periphery of the bottom wall and is extended in a direction facing the base 50, and an end of the side wall away from the bottom wall is connected to the base 50. In order to facilitate the repair and replacement of the parts located inside the cover 10, the side wall of the cover 10 may be detachably connected to the base 50, specifically may be connected by screws, buckle connection or magnetic fixation, etc., so as to simplify the disassembly and assembly process of the cover 10. Certainly, the present disclosure is not limited thereto. In other embodiments, the cover 10 may be fixedly connected to the base 50.

The operator 20 may be mainly configured for the user to drive and perform the corresponding pivot action to realize the input of the corresponding action signal. For example, by driving the operator 20 to pivot forward, backward, left, or right, the corresponding forward, backward, left, or right action signals are input. The operating part 21 of the operator 20 is exposed to an outside of the cover 10 by penetrating through the opening 11 of the cover 10, and a projection of the operating part 21 on the horizontal plane may be circular. The upper hemisphere 23 of the operator 20 is configured to be connected to the upper support 71 to achieve a spherical rotational fit of the operator 20. The upper hemisphere 23 is hemispheric shape, an upper surface of the upper hemisphere 23 is spherical and connected to the lower end of the operating part 21. A lower surface of the upper hemisphere 23 is a plane surface, that is, the hemispherical plane part 25.

The operating part 21 of the operator 20 sequentially penetrates through the first rocker arm 31 and the second rocker arm 33, and may be mainly configured for driving the first rocker arm 31 and the second rocker arm 33 to rotate accordingly. The rotating amounts of the first rocker arm 31 and the second rocker arm 33 are respectively detected by the first rotary electric component 41 and the second rotary electric component 43, so as to output corresponding signals according to rotating amounts. Defining an X direction and a Y direction perpendicular to each other on the horizontal plane, the rotating axis of the first rocker arm 31 may be along one of the X direction and the Y direction, and the rotating axis of the second rocker arm 33 may be along the other one of the X direction and the Y direction. Shapes of the first rocker arm 31 and the second rocker arm 33 can be roughly C-shaped on the vertical plane, both opposite ends of the first rocker arm 31 and the second rocker arm 33 are rotatably connected to the side wall of the cover 10 through rotating shafts. The first rotary electrical component 41 may be arranged on the outside of the cover 10 and connected to the first rocker arm 31; and the second rotary electrical component 43 may also be arranged on the outside of the cover 10 and connected to the second rocker arm 33. The first rotary electrical component 41 and the second rotary electrical component 43 may be mainly configured for detecting the rotating amounts of the first rocker arm 31 and the second rocker arm 33, since the working principle of which is prior art, it will not be detailed here.

The base 50 may be mainly configured to fix parts such as the cover 10 and the upper support 71, and play a bearing and supporting role. The pressing switch 60 can be mainly configured to detect the pressing action of the operator 20 and output a corresponding action signal. Since the operation principle of the pressing switch 60 is prior art, it will not be described in detail here. The pressing switch 60 can be directly triggered by the operator 20 when the operator 20 is pressed, certainly, it can also be indirectly triggered by the operator 20 when the operator 20 is pressed, the present disclosure is not limited thereto, as long as the pressing switch 60 can be triggered when the operator 20 is pressed.

The upper support 71 can be mainly configured to limit the operator 20, so that when the operator 20 is driven, the reaction force cannot be applied to the first rocker arm 31 and the second rocker arm 33 between the upper support 71 and the bottom wall of the cover 10. The upper support 71 may be roughly cylindrical, its upper end defines a hemispherical hole 711 and a through hole 713 communicated to the hemispherical hole 711, and its inner top wall connected to the hemispherical hole 711 is formed as an upper support plane part 715. A lower end of the upper support 71 is connected to the base 50. In order to facilitate the maintenance and replacement of the upper support 71 and the operator 20 partially located inside the upper support 71, the upper support 71 and the base 50 may be detachably connected. Specifically, the upper support 71 and the base 50 may be engaged, screw connected, or magnetically fixed, to simplify the disassembly and assembly of the upper support 71. In addition, the operator 20 defines a hole 28 at a center, and the hole 28 is extended from the operating part 21 to the lower hemisphere 27. As a result, the material of the operator 20 may be reduced, so as to reduce the weight of the operator 20 and improve the convenience of the operation of the operator 20, at the same time, the raw materials required for the production of the operator 20 can be reduced and the manufacturing cost of the operator 20 can be reduced.

According to the technical solution of the present disclosure, the operator 20 of the multi-directional input device includes an operating part 21 and an upper hemisphere 23. The operating part 21 can be configured for user operation, and the upper hemisphere 23 can be configured to limit and fix the operator 20. Specifically, the upper hemisphere 23 is abutted against and fitted with the hole wall of the hemispherical hole 711 of the upper support 71, and the upper hemisphere 23 can be limited through the hole wall of the hemispherical hole 711. In the related art, the operator 20 of the multi-directional input device is limited by one of the first rocker arm 31 and the second rocker arm 33, so that when the operator 20 is driven by the user, the generated reaction force may act on the first rocker arm 31 or the second rocker arm 33 that limits the operator 20, resulting in a difference in hand feeling of the operator 20 when driving the first rocker arm 31 and the second rocker arm 33. While according to the present disclosure, after the operator 20 of the multi-directional input device is driven by the user, the reaction force generated will only act on the upper hemisphere 23 of the operator 20 and the upper support 71 that limits the operator 20, without acting on the first rocker arm 31 and the second rocker arm 33. That is, the first rocker arm 31 and the second rocker arm 33 are affected by the driving force of the operator 20, and are not affected by the reaction force, so that the first rocker arm 31 and the second rocker arm 33 are operated in different directions without causing a difference in hand feeling. In addition, the upper hemisphere 23 of the operator 20 in the present disclosure is hemispherical, so that the operator 20 and the upper support 71 are spherical rotation fit, therefore, the multi-directional input device can be arbitrarily operated in directions of 360°.

Figure 4:
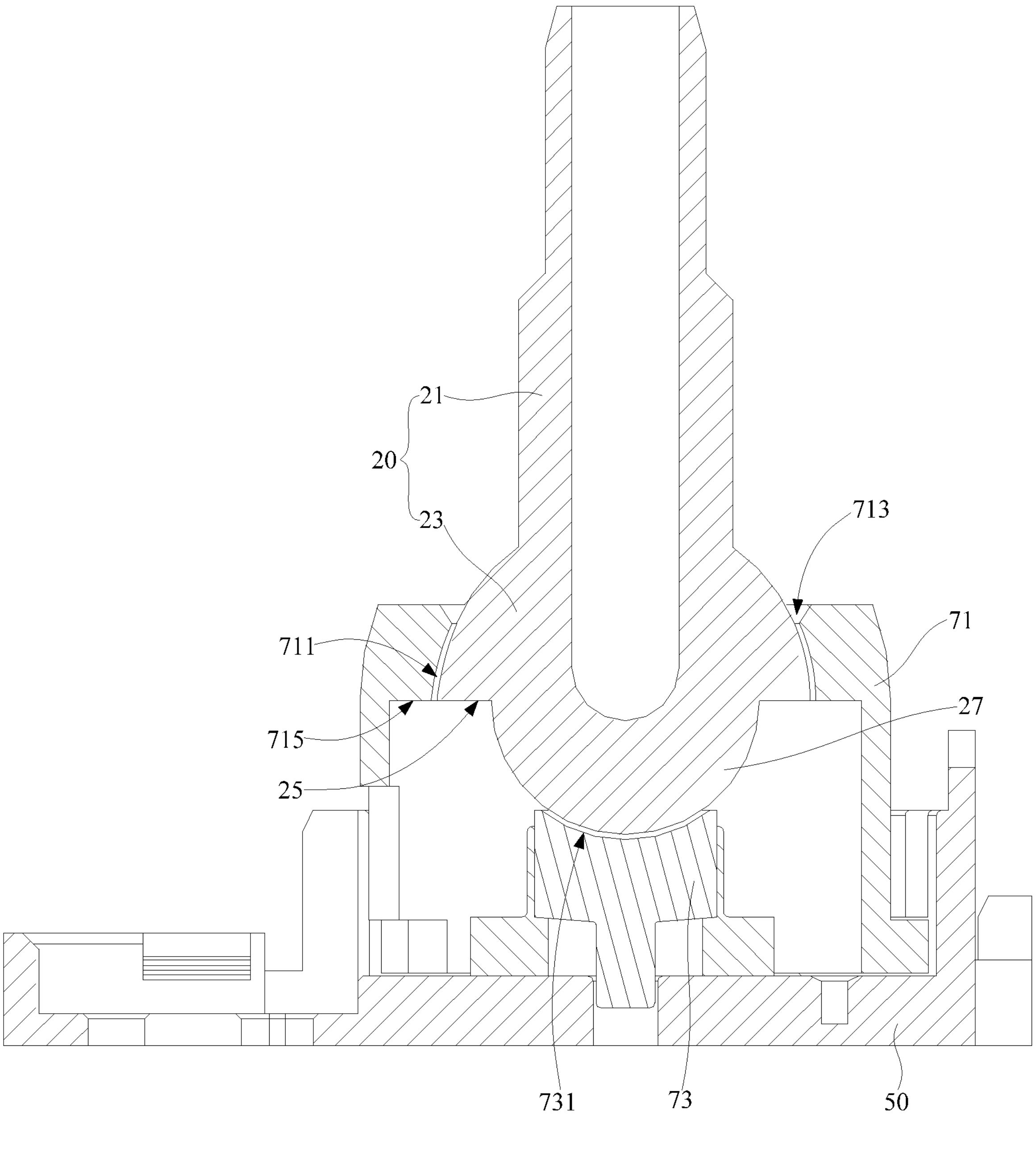
FIG. 4 is a cross-sectional view of another partial structure of the multi-directional input device in FIG. 1.

Referring to FIG. 4, in an embodiment of the present disclosure, when the operator 20 is in a vertical state, the hemispherical plane part 25 and the upper support plane part 715 are coplanar.

It can be understood that the hemispherical plane part 25 and the upper support plane part 715 are located in a same plane, that is, the hole wall of the hemispherical hole 711 and the upper hemisphere 23 have a more suitable abutment area. In this way, when the operator 20 is driven, the hole wall of the hemispherical hole 711 can better guide and limit the upper hemisphere 23, at the same time, the operator 20 can be driven smoothly without causing a large friction force to the upper hemisphere 23. Certainly, it should be noted that the present disclosure is not limited to this, in other embodiments, when the operator 20 is not in a vertical state, the hemispherical plane part 25 may also be higher or lower than the upper support plane part 715.

Figure 3:
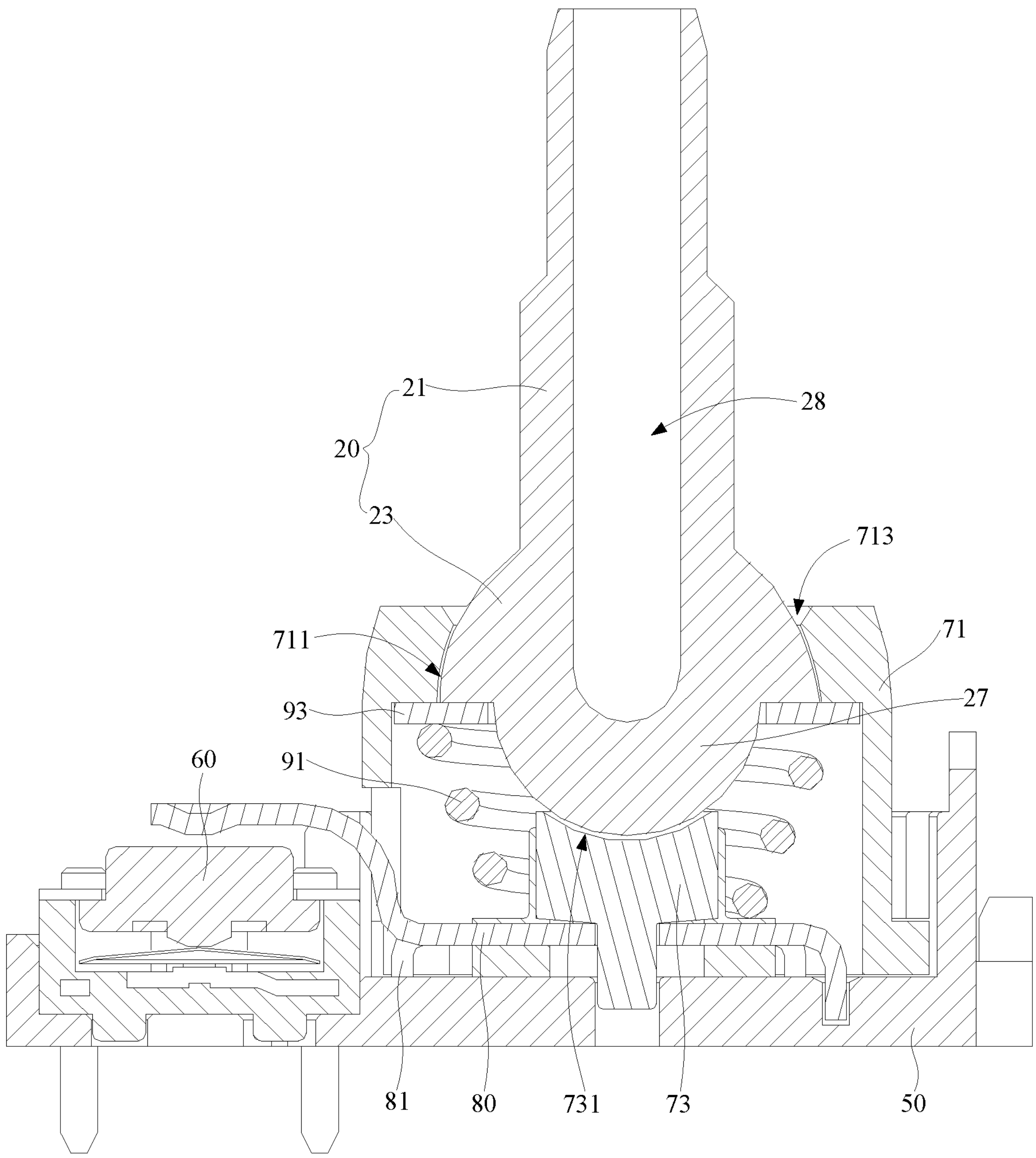
FIG. 3 is a cross-sectional view of a partial structure of the multi-directional input device in FIG. 1.

Referring to FIGS. 3 and 4, in an embodiment of the present disclosure, the multi-directional input device further includes a lower support 73 arranged on the base 50 and movable in the up-down direction. The lower support 73 includes a hemispherical concave 731 at an upper end. The operator 20 includes a lower hemisphere 27 below the hemispherical plane part 25, a diameter of the lower hemisphere 27 is smaller than the diameter of the upper hemisphere 23, and the lower hemisphere 27 is disposed opposite to the hemispherical concave 731.

It can be understood that the lower hemisphere 27 and the hemispherical concave 731 of the lower support 73 are matched, with the hemispherical concave 731, the operator 20 can be further guided when driven, so that the accuracy of the pivoting of the operator 20 with respect to the upper support 71 can be further improved. At the same time, the hemispherical concave 731 also has a certain supporting effect on the operator 20, so that the stability of the mounting of the operator 20 can be improved. The lower hemisphere 27 is hemispherical, and its upper surface is flat and connected to the hemispherical plane 25. A center of the lower hemisphere 27 and a center of the upper hemisphere 23 are located at a same point. A lower surface of the lower hemisphere 27 is spherical, it can abut against the hemispherical concave 731 of the lower support 73.

Referring to FIG. 3, in an embodiment of the present disclosure, the multi-directional input device further includes a pressing bracket 80 arranged on the base 50 and below the lower support 73. A lower part of the lower support 73 is pressed down when the operator 20 is pressed, and a fulcrum 81 of the pressing bracket 80 abutted against the base 50 and an end of the pressing bracket 80 are pressed down together with the operator 20 to trigger the pressing switch 60 to achieve electrical action.

It can be understood that the pressing switch 60 may be indirectly pressed through the pressing bracket 80 when the operator 20 is pressed, at this time, the pressing switch 60 does not need to be disposed below the lower support 73, but can be disposed on one side of the lower support 73 and located outside the cover 10. In this way, the requirement for the mounting position of the pressing switch 60 is reduced, so as to facilitate mounting of the pressing switch 60. At the same time, this arrangement can also make the distribution of various parts of the multi-directional input device more compact in the up-down direction, and reduce the overall volume of the multi-directional input device so that it can be managed and carried. The specific pressing process is as follows: the lower hemisphere 27 moves downwardly to drive the hemispherical concave 731, so that the lower part of the lower support 73 presses the pressing bracket 80. One end of the pressing bracket 80 abuts against the base 50 and forms at least one fulcrum 81, and the at least one fulcrum 81 of the pressing bracket 80 abutted against the base 50 and the other end of the pressing bracket 80 are pressed down together to press the pressing switch 60 to trigger the pressing switch 60 to achieve an electrical operation. One end of the pressing bracket 80 is located between the lower support 73 and the base 50, and abuts against the base 50, and the other end extends through the upper support 71 and the cover 10 to be above the pressing switch 60.

In order to improve the stability of the lower support 73 when moving up and down, the lower support 73 may include a guide column extending downward at the lower end. The base 50 correspondingly defines a guide hole, and the guide column is inserted into the guide hole. In this way, the guiding of the movement of the lower support 73 in the up-down direction is realized by the cooperation of the guide column and the guide hole.

In addition, in order to facilitate maintenance and replacement of the pressing switch 60 when it is damaged, the pressing switch 60 may be detachably connected to the base 50. Specifically, the pressing switch 60 may be fixed to the base 50 by a snap connection, a screw connection, or a magnetic attraction. In order to further improve the stability of the mounting of the pressing switch 60, the base 50 can include an accommodating part, which is adapted to a shape of the pressing switch 60, and a part of the pressing switch 60 is embedded in the accommodating part.

In an embodiment of the present disclosure, the lower support 73 and the pressing bracket 80 are made of a resin material and integrally formed. That is, both the lower support 73 and the pressing bracket 80 may be made of a resin material. Further, the lower support 73 and the pressing bracket 80 may be formed as an integrated connection structure to trigger the pressing switch. The integrated structure can improve the connection strength, and at the same time, it can be manufactured by one-piece molding to improve the production efficiency. Certainly, the present disclosure is not limited thereto. In other embodiments, the lower support 73 and the pressing bracket 80 may be separately and independently arranged.

Referring to FIG. 3, in an embodiment of the present disclosure, the multi-directional input device further includes a donut-shaped pressing plate 93 and a coil spring 91, where the pressing plate 93 is simultaneously abutted against the hemispherical plane part 25 and the upper support plane part 715. A diameter of the pressing plate 93 is slightly smaller than the diameter of the upper support plane part 715, and the pressing plate 93 defines a hole having a diameter being slightly greater than the diameter of the lower hemisphere 27 in a center. The coil spring 91 is clamped between the base 50 and the pressing plate 93 and presses the pressing plate 93 in an upward direction.

It can be understood that the coil spring 91 generates a reaction force after the operator 20 is driven, and then acts on the pressing plate 93, and the operator 20 is driven by the pressing plate 93 to realize automatic reset, thereby facilitating the use of the multi-directional input device. The coil spring 91 may be sleeved on the outside of the lower support 73, so that a center line of the coil spring 91 and a center line of the operator 20 are located in a same straight line, thus, a uniform elastic force can be applied to each direction of the operator 20.

The arrangement of the pressing plate 93 makes the upper end of the coil spring 91 abut against a lower surface of the pressing plate 93 to realize the indirect plane connection to the operator 20, which is possible to avoid the situation that the operator 20 and the coil spring 91 are easily separated from each other when the operator 20 and the coil spring 91 directly abut, thereby ensuring that the coil spring 91 can stably apply an elastic force on the operator 20. The pressing plate 93 may include a top wall and a side wall. The top wall simultaneously abuts with the hemispherical plane part 25 and the upper support plane part 715. The side wall is arranged around a periphery of the top wall and extends downward. So that the coil spring 91 can abut against a lower surface of the top wall and an inner surface of the side wall of the pressing plate 93 to further limit the coil spring 91 by the pressing plate 93. The pressing plate 93 defines a hole at a center, so that the pressing plate 93 can surround the outer side of the upper hemisphere 23 and uniformly abut against the hemispherical plane part 25 and the upper support plane part 715. Certainly, the present disclosure is not limited thereto. In other embodiments, the coil spring 91 may also abut against the operating part 21 of the operator 20 and the cover 10, as long as the operator 20 can be driven to reset after being pivoted by the user. In addition, the coil spring 91 may be provided in a conical shape, and a diameter of the coil spring 91 is gradually reduced in the direction from above to below. In this way, it is possible to realize that the upper end of the coil spring 91 abuts against the pressing plate 93 and at the same time give the lower hemisphere 27 a better avoidance space; it can also achieve a better abutment limit on the lower end of the coil spring 91. The base 50 may be further provided with a guide cylinder at a position corresponding to the guide hole, and the guide cylinder surrounds the outer side of the lower support 73. The lower end of the coil spring 91 may be sleeved on the outer side of the guide cylinder, so that the limit of the coil spring 91 is realized by abutting the outer side wall of the guide cylinder and the inner side wall of the coil spring 91.

Figure 6:
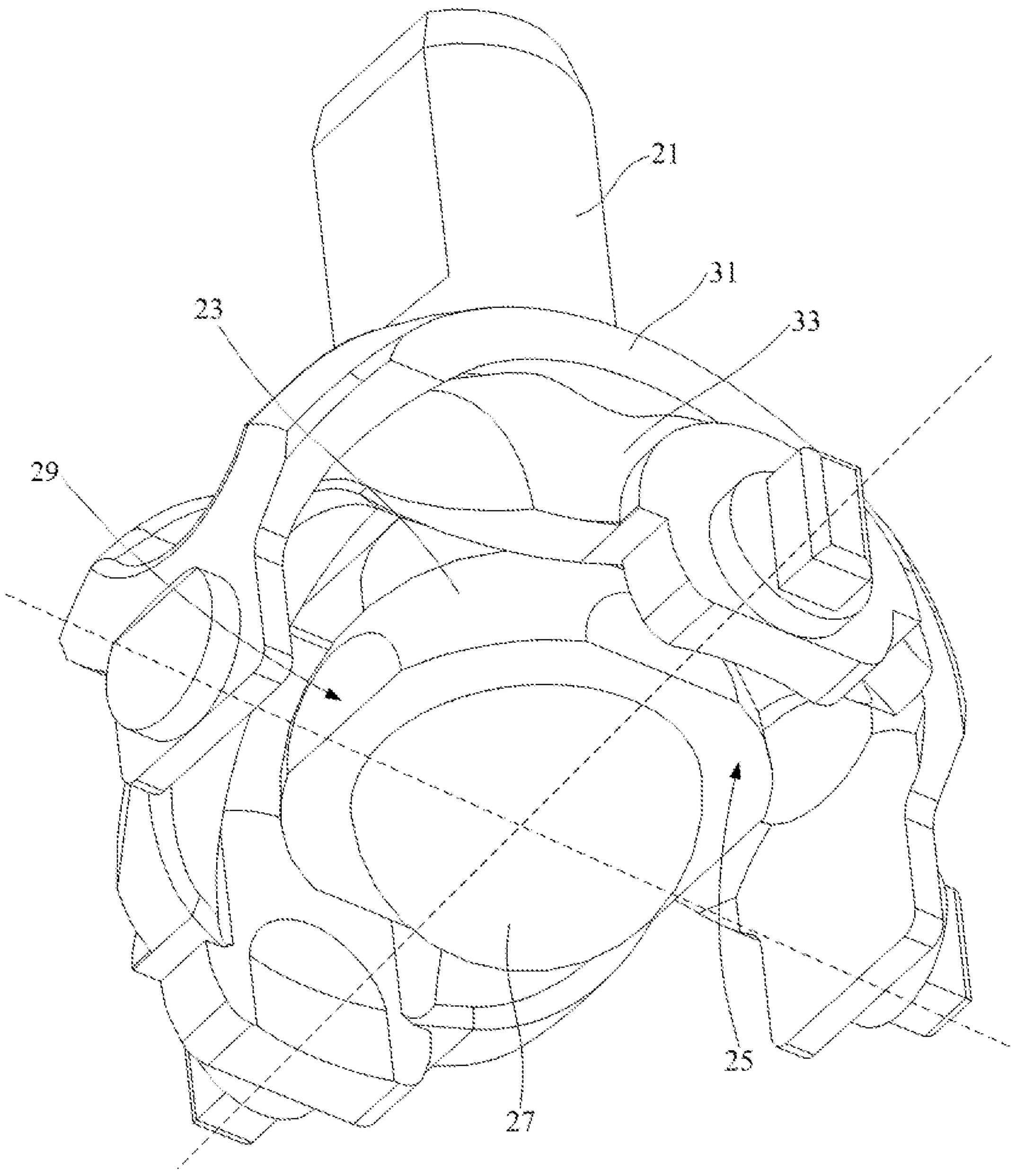
FIG. 6 is a schematic structural view of the operator of the multi-directional input device in FIG. 1 according to another embodiment.

Referring to FIG. 6, in an embodiment of the present disclosure, at least one plane part 29 is provided around the upper hemisphere 23.

It can be understood that the at least one plane part 29 is not abutted against the hole wall of the hemispherical hole 711, so that the friction force formed between the area and the hole wall of the hemispherical hole 711 can be reduced. In this way, when the operator 20 is pivoted in a direction in which the plane part 29 is formed, the operator 20 can be pivoted more conveniently and quickly. The plane part 29 may be formed by cutting off part of the material in the vertical direction at the position of the upper hemisphere 23 near the hemispherical plane part 25. Four plane parts 29 may be provided, and the four plane parts 29 are evenly spaced around the center of the upper hemisphere, so that the operator 20 is pivoted more conveniently and quickly in the forward, backward, left and right directions. Certainly, the present disclosure is not limited thereto. In other embodiments, the at least one plane part 29 may be formed by cutting off part of the material in the oblique direction at the position of the upper hemisphere 23 near the hemispherical plane part 25, and a number of the at least one plane part 29 may be one, two, three, five or more, etc.

Figure 5:
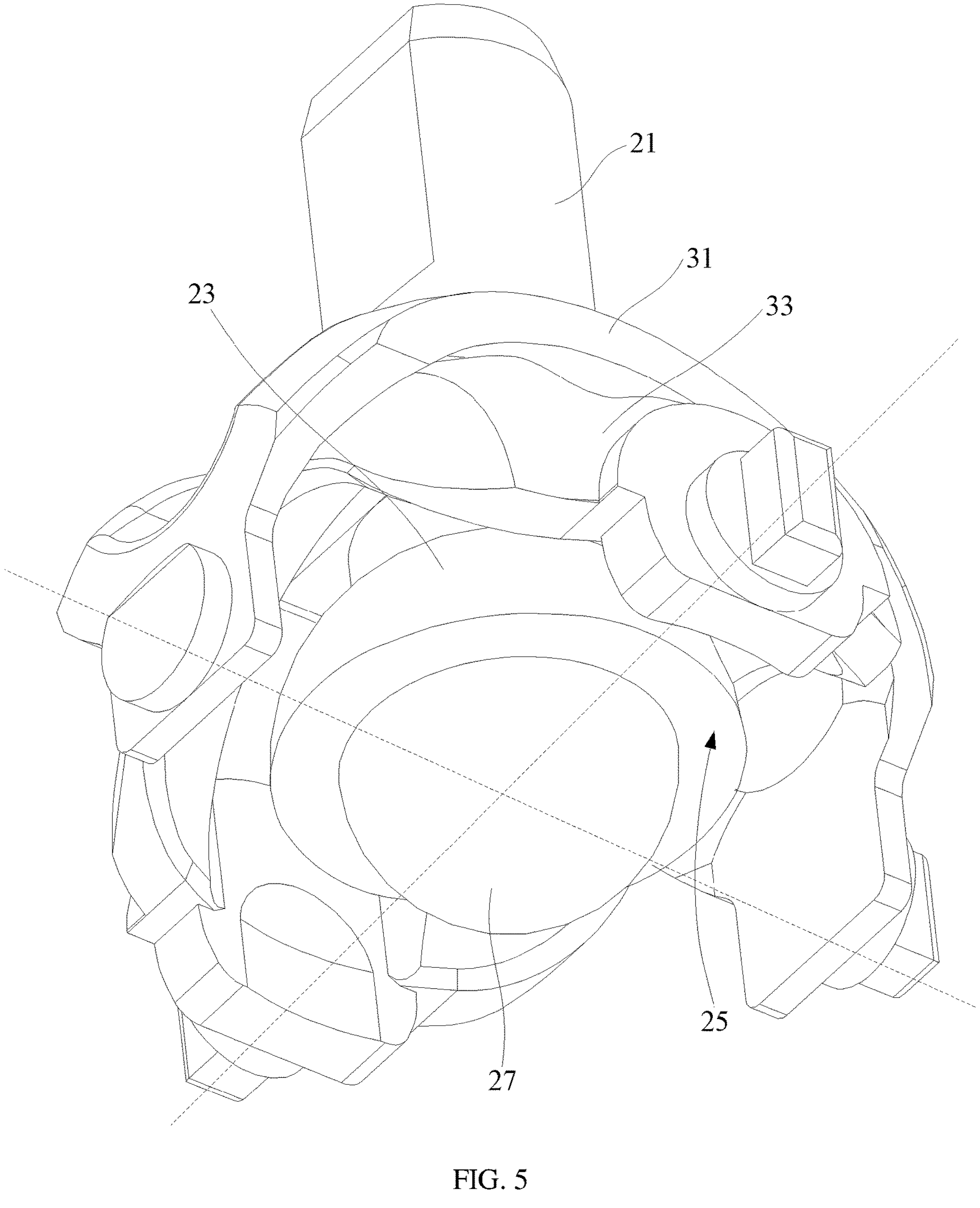
FIG. 5 is a schematic bottom view of an operator, a first rocker arm and a second rocker arm of the multi-directional input device in FIG. 1.

Referring to FIG. 5, in an embodiment of the present disclosure, an intersection of the rotating axes of the first rocker arm 31 and the second rocker arm 33 coincides with a spherical center of the upper hemisphere 23.

It can be understood that when the operator 20 drives the first rocker arm 31 to rotate, a center of rotation of the first rocker arm 31 and the spherical center of the upper hemisphere 23 are located at the same point; and when the operator 20 drives the second rocker arm 33 to rotate, a center of rotation of the second rocker arm 33 remains at the same point as the spherical center of the upper hemisphere 23. This may further ensure the consistency of rotation of the first rocker arm 31 and the second rocker arm 33 when driven, and further improve the consistency of the hand feeling of the first rocker arm 31 and the second rocker arm 33 when driven.

The present disclosure further provides a game machine, which includes a multi-directional input device, and the specific structure of the multi-directional input device refers to the above embodiments. Since the game machine adopts all the technical solutions of all the above-mentioned embodiments, it has at least all the beneficial effects brought by the technical solutions of the above-mentioned embodiments, which will not be repeated here. The game machine may include a display device electrically connected to the multi-directional input device.

The above is only preferable embodiments of the present disclosure, and thus does not limit the scope of the present disclosure, and the equivalent structural transformation made by the content of the specification and the drawings of the present disclosure, or directly/indirectly applied to other related technical fields are all included in the patent protection scope of the present disclosure.

What is claimed is:

1. A multi-directional input device, comprising:

a cover defining an opening;

a pivotable operator protruding upward from the opening;

a first rocker arm and a second rocker arm rotating with pivoting of the operator, rotating axes of the first rocker arm and the second rocker arm being perpendicular to each other;

a first rotary electrical component and a second rotary electrical component respectively detecting rotation of the first rocker arm and rotation of the second rocker arm;

a base fixing the cover;

a pressing switch pressed by the operator to achieve electrical action; wherein:

the operator comprises a cylindrical operating part protruding upward from the opening;

the operating part is provided with a hemispherical upper hemisphere at a lower end, the upper hemisphere comprises a hemispherical plane part at a lower part, a diameter of the hemispherical plane part is the same as a diameter of the upper hemisphere, and the diameter of the upper hemisphere is greater than a diameter of the operating part;

the multi-directional input device further comprises an upper support fixed to the base and defining a hemispherical hole, a hole wall of the hemispherical hole is abutted against the upper hemisphere, the upper support further defines a through hole above the hemispherical hole, the operating part is penetrated through the through hole, and a diameter of the through hole is greater than the diameter of the operating part; and the upper support comprises an upper support plane part below the hemispherical hole, and a diameter of the upper support plane part is greater than a diameter of the hemispherical hole.

2. The multi-directional input device of claim 1, wherein when the operator is in a vertical state, the hemispherical plane part and the upper support plane part are coplanar.

3. The multi-directional input device of claim 1, further comprising a lower support installed on the base and comprising a hemispherical concave;

wherein the operator comprises a lower hemisphere below the hemispherical plane part, a diameter of the lower hemisphere is smaller than the diameter of the upper hemisphere, and the lower hemisphere is disposed opposite to the hemispherical concave.

4. The multi-directional input device of claim 3, further comprising a pressing bracket arranged on the base and below the lower support;

wherein a lower part of the lower support is pressed down when the operator is pressed, and a fulcrum of the pressing bracket abutted against the base and an end of the pressing bracket are pressed down together with the operator to trigger the pressing switch to achieve electrical action.

5. The multi-directional input device of claim 4, wherein the lower support and the pressing bracket are made of a resin material and integrally formed.

6. The multi-directional input device of claim 1, further comprising a donut-shaped pressing plate and a coil spring, wherein the pressing plate is simultaneously abutted against the hemispherical plane part and the upper support plane part, a diameter of the pressing plate is slightly smaller than the diameter of the upper support plane part, and the pressing plate defines a hole having a diameter being slightly greater than the diameter of the lower hemisphere in a center; and the coil spring is clamped between the base and the pressing plate and presses the pressing plate in an upward direction.

7. The multi-directional input device of claim 1, further comprising at least one plane part provided around the hemispherical plane part.

8. The multi-directional input device of claim 1, wherein an intersection point of the rotating axes of the first rocker arm and the second rocker arm coincides with a spherical center of the upper hemisphere.

9. A game machine comprising the multi-directional input device as recited in claim 1.

10. The game machine of claim 9, wherein when the operator is in a vertical state, the hemispherical plane part and the upper support plane part are coplanar.

11. The game machine of claim 9, further comprising a lower support installed on the base and comprising a hemispherical concave;

wherein the operator comprises a lower hemisphere below the hemispherical plane part, a diameter of the lower hemisphere is smaller than the diameter of the upper hemisphere, and the lower hemisphere is disposed opposite to the hemispherical concave.

12. The game machine of claim 11, further comprising a pressing bracket arranged on the base and below the lower support;

wherein a lower part of the lower support is pressed down when the operator is pressed, and a fulcrum of the pressing bracket abutted against the base and an end of the pressing bracket are pressed down together with the operator to trigger the pressing switch to achieve electrical action.

13. The game machine of claim 12, wherein the lower support and the pressing bracket are made of a resin material and integrally formed.

14. The game machine of claim 9, further comprising a donut-shaped pressing plate and a coil spring, wherein the pressing plate is simultaneously abutted against the hemispherical plane part and the upper support plane part, a diameter of the pressing plate is slightly smaller than the diameter of the upper support plane part, and the pressing plate defines a hole having a diameter being slightly greater than the diameter of the lower hemisphere in a center; and the coil spring is clamped between the base and the pressing plate and presses the pressing plate in an upward direction.

15. The game machine of claim 9, further comprising at least one plane part provided around the hemispherical plane part.

16. The game machine of claim 9, wherein an intersection point of the rotating axes of the first rocker arm and the second rocker arm coincides with a spherical center of the upper hemisphere.

* * * * *